United States Patent [19]

Vouillon et al.

[11] Patent Number: 5,352,002
[45] Date of Patent: Oct. 4, 1994

[54] DEVICE FOR CLEARANCE-FREE MOUNTING OF PANES OF GLASS

[75] Inventors: Patrick Vouillon, Villebon sur Yvette; Claude Bedoya, Montigny le Bretonneux; Philippe Gaultier, Le Chesnay, all of France

[73] Assignee: Sextant Avionique, Meudon la Foret, France

[21] Appl. No.: 135,348

[22] Filed: Oct. 13, 1993

[30] Foreign Application Priority Data

Nov. 12, 1992 [FR] France ................. 92 13799

[51] Int. Cl.$^5$ .................................................. E05C 1/06
[52] U.S. Cl. ................................... 292/155; 292/256; 411/539; 411/973
[58] Field of Search ............... 292/256, 155, 149, 342, 292/256.71, 256.75, 251, DIG. 20; 411/539, 541, 169, 973, 522; 52/173, 774, 764; 49/463

[56] References Cited

U.S. PATENT DOCUMENTS

| | | | |
|---|---|---|---|
| 558,050 | 4/1896 | Eldridge | 292/256 |
| 890,062 | 6/1908 | Johnson | 292/256 |
| 1,676,289 | 7/1928 | Schmalz | 292/256 X |
| 1,688,425 | 10/1928 | Hodny et al. | 52/764 X |
| 2,356,878 | 8/1944 | Painter | 52/764 X |
| 2,360,004 | 10/1944 | MacLean, Jr. | 52/764 X |
| 4,169,617 | 10/1979 | Koeneman et al. | |
| 5,065,842 | 11/1991 | Nahar | 49/463 X |

FOREIGN PATENT DOCUMENTS

| | | |
|---|---|---|
| 2060919 | 12/1970 | Fed. Rep. of Germany . |
| 1154239 | 6/1956 | France . |
| 346912 | 3/1957 | Switzerland . |

*Primary Examiner*—Rodney M. Lindsey
*Attorney, Agent, or Firm*—Browdy and Neimark

[57] ABSTRACT

The device for clearance-free mounting of panes of glass embodying the invention comprises blocks each having a through passage of oblong section in which can freely pass a fastening screw intended to be screwed into a threaded bore of the support of a pane of glass, the blocks also having an oblique face susceptible of sliding and self-adjusting against an edge of the pane of glass. The invention notably enables a protective pane of glass to be fixed to a viewing screen.

9 Claims, 2 Drawing Sheets

DEVICE FOR CLEARANCE-FREE MOUNTING OF PANES OF GLASS

BACKGROUND OF THE INVENTION

1. Field of the Invention

This invention relates to a device for clearance-free mounting of a pane of glass onto a rigid support.

It applies notably, though not exclusively, to the mounting of a protective pane of glass onto flat cathode or liquid crystal screens.

2. Description of the Prior Art

The achieve this result, the prior art has used rectangular bracket-shaped clamps of which one of the two legs is applied against the upper side of the pane of glass, while the other is drilled with a hole in which is inserted a screw enabling the clamp to be fastened to the pane support.

The utilisation of such clamps, always of the same dimensions, imposes that the panes of glass be of perfectly calibrated thickness obtained by precise and therefore costly machining.

If one wishes to avoid limiting oneself to the use of panes of glass of constant thickness to obtain clearance-free mounting, these thickness variations must be compensated either by clamps of adapted shapes, or by shims of variable thicknesses, which is ill-suited to the mounting of panes of glass in an industrial process with high production rates.

In addition, during tightening of the fastening screw, the clamp exerts a pressure directed perpendicularly to the upper side of the pane of glass. If this pressure exceeds a certain threshold, the glass breaks. This device therefore requires the use of a dynamometric screwdriver indicating the tightening pressure.

Moreover, due to the prestressing exerted by the clamps, the pane of glass is made fragile and therefore risks being broken by the effects of external action such as e.g. differential expansion phenomena.

In this respect, it should be recalled that glass has a high coefficient of expansion.

OBJECT OF THE INVENTION

The main object of this invention is to remedy the preceding disadvantages by way of a solution enabling the irregularities of glass thickness to be overcome and all prestressing of the glass to be suppressed. To this end, it provides a device for clearance-free mounting of a pane of glass onto a rigid support by means of at least one block having a through passage along an axis in which can freely pass a fastening screw intended to be screwed into a threaded bore of the support.

SUMMARY OF THE INVENTION

This device is characterized in that the passage penetrating the block has an oblong section in a plane perpendicular to said axis, and in that the block has a face that is oblique in relation to said axis and susceptible of sliding and self-adjusting against an edge of the pane of glass during screwing of the screw.

This device thus enables precise adjusting to be obtained without prestressing of the block against the edge of the pane of glass, thereby eliminating all risks of the glass breaking.

The pane of glass is maintained on the support by the simple contact between the two inclined faces, one situated on the block and the other on the edge of the pane of glass.

The block thus has no hold on the pane of glass. Consequently, the block cannot in any way exert a force against the upper side of the pane of glass, no matter how tightly the screw is tightened.

For these reasons, the pane of glass can be maintained by blocks whose height is independent of the thickness of the pane of glass.

This device therefore enables any variations in the thickness of the pane of glass to be overcome.

According to a feature of the invention, the edges of the pane of glass susceptible of coming into contact with a block are therefore either rounded or bevelled.

Such a pane of glass can be obtained simply, e.g. by grinding of the sharp edges adjacent to a same face. The machining of such a pane of glass does not therefore present any particular difficulties and, consequently, is relatively inexpensive.

Advantageously, to allow expansion of the glass while maintaining the pane of glass without any clearance, the inclined faces of the blocks are covered with an elastic seal.

According to another feature of the invention, the block comprises a means for automatically maintaining it against the edge of the pane of glass during the tightening of the screw.

This means can consist, e.g. in a material with a high coefficient of friction covering the zone of the upper face of the block which comes into contact with the head of the tightening screw, on just one side of the cavity.

During the rotational movement communicated to the screw with a view to tightening it, the head of the screw rubs against this material, on one single side of the cavity, and accordingly transmits to the block a force directed towards the pane of glass.

In this way, the block is automatically maintained against the inclined portion of the pane of glass during the tightening of the screw.

This material also has a high compressibility such as e.g. foam in a plastic material, to enable it to be crushed under the effect of the tightening of the screw against the block. In this way, once the screw has been tightened, it exerts pressure on the upper side of the block, simultaneously on both sides of the cavity. All risks of deformation of the block during tightening against the support are thus avoided.

By way of this arrangement, the mounting of the block is performed very simply, the block being automatically pinned against the pane of glass during the tightening of the screw.

In addition to the advantages previously mentioned, considerable economic advantages are derived from the device embodying the invention, notably as regards the machining of the panes of glass, as well as the possibility of integrating assembly thereof in an industrial process with high production rates.

As the blocks of the device embodying the invention are not applied against the upper side of the pane of glass, this also results in minimum space requirements, as the height of the clamps can be less than the thickness of the glass.

This aspect is predominant in the new man-machine interface applications integrating flat screens. In fact, it is of paramount importance that the latter be placed as close a possible to the protective glass and have low space requirements.

BRIEF DESCRIPTION OF THE DRAWINGS

Further features and advantages of an embodiment of the terminal according to the invention will be described hereinafter, by way of a non-limiting example, in reference to the accompanying drawings in which.

DESCRIPTION OF THE PREFERRED EMBODIMENTS

Figure 1:
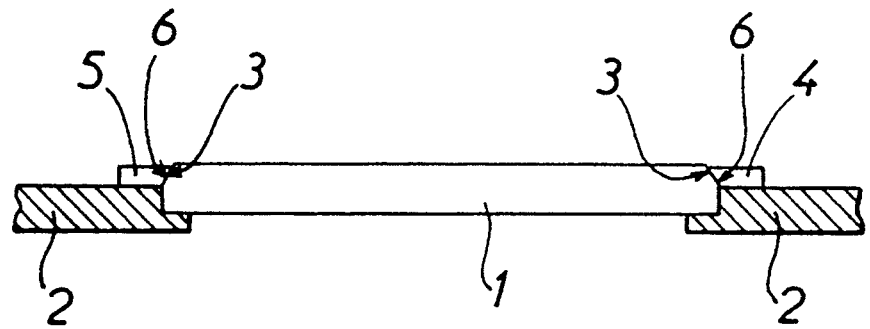
FIG. 1 schematically represents a cross-section of a pane of glass mounted onto a support by means of the device embodying the invention.

FIG. 1 shows a support 2 forming a frame with a rabbet in which a pane of glass 1 engages partially, one part of the edge of this pane of glass 1 emerging from the support 2. This part of the edge has a bevelled face 3 against which the fastening clamps 4, 5 are applied.

These clamps 4, 5 are in the shape of a trapezoid whose longitudinal section along an axis X perpendicular to the plane of the pane of glass 1 is a rectangular trapezoid. They have, in their front part, an inclined face 6, whose inclination corresponds substantially to that of the bevelling 3 provided on the edge of the pane of glass 1, and against which it comes to rest.

Figure 3:
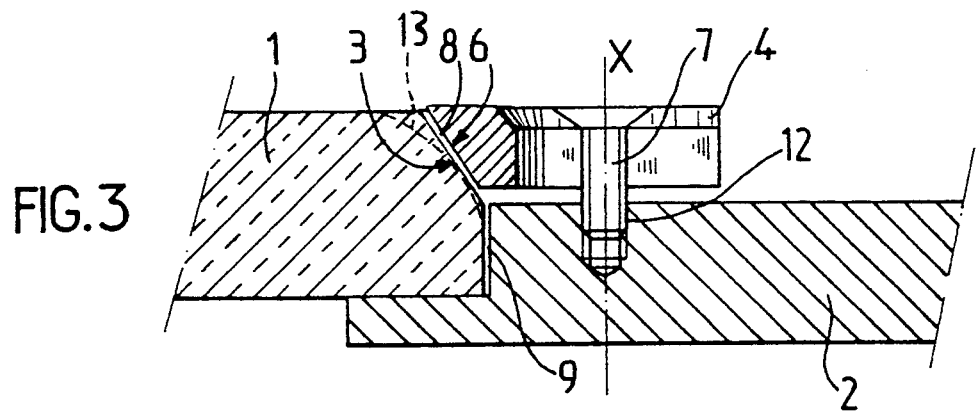
FIGS. 3 and 4 show, in a section along AA, different stages of the fastening of the clamp.

Of course, such clamps could also be mounted to a pane of glass whose edges, to which they are applied, would be simply rounded (dotted line 13 on FIG. 3).

Figure 4:
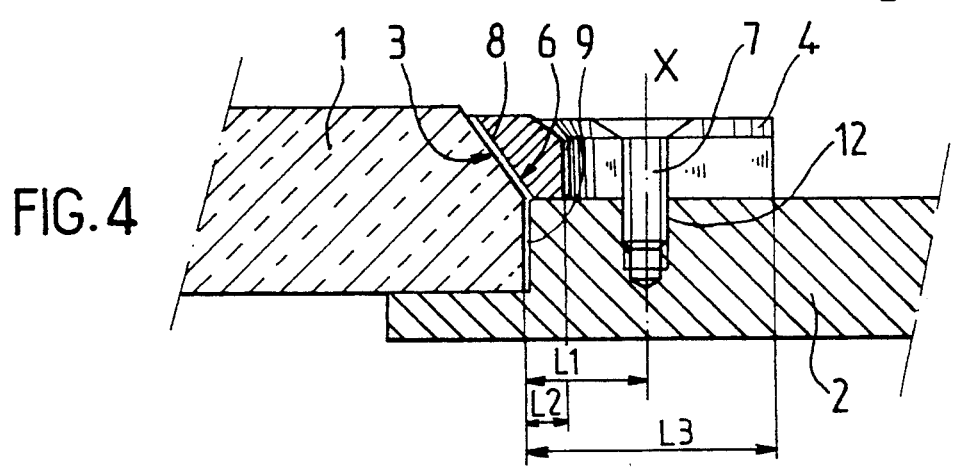
Figure 2:
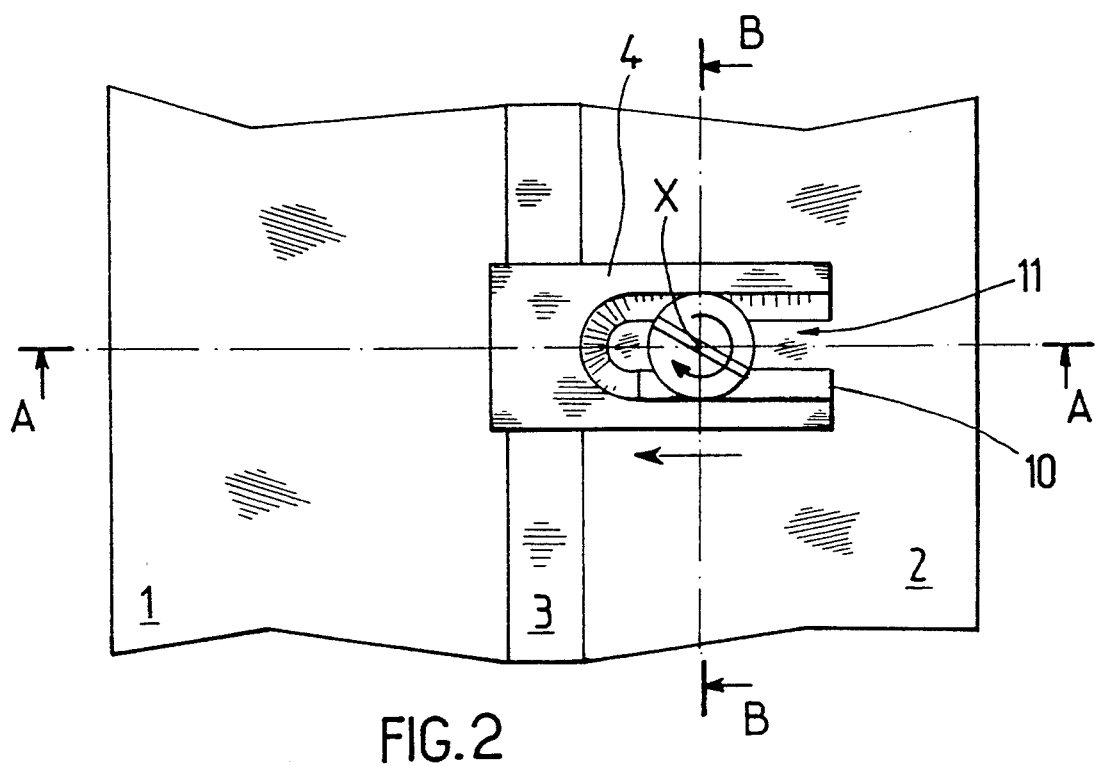
FIG. 2 is a top view of a clamp mounted on the support of the pane of glass.

As represented in FIGS. 2 to 4, the clamp 4 comprises, in its rear part, a slot 11 along axis X open on both the lower sides (in contact with the support 2) and the upper sides opposite the oblique face 6. This slot 11 forms an oblong-shaped passage which is crossed along the axis X by a fastening screw 7 to be screwed into the threaded bore 12 provided in the support 2. In this way, in the presence of the screw 7 partially inserted into the bore 12, the slot 11 endows the clamp 4 with mobility along the axis X and perpendicular to this axis and to the bevel 3 of the pane of glass 1.

In order for the clamp 4 to be capable of being mounted resting against the pane of glass 1, the bore 12 must be situated at a distance L1 from the pane of glass 1 included between the distance L2, between the pane of glass 1 and the start of the slot 11 (to within the half-diameter of the screw 7), and the distance L3 between the pane of glass 1 and the side opposite the oblique face 6. In order to obtain proper fastening of the clamp, this distance L1 should be preferably as close as possible to the distance L2.

The clamp 4 and the screw are firstly put into position: the inclined face 6 of the clamp 4 is applied against the bevel 3, without the lower face of the clamp 4 being necessarily in contact with the support 2, while the end of the screw 7 crosses the slot 11 and enters into the bore 12 (FIG. 3). By way of the presence of a slot and not of a bore, the clamp 4 and the screw 7 can be positioned indifferently one before the other.

During tightening of the screw 7, the clamp 4 comes closer to the support 2, until it comes into contact with the latter (FIG. 4). During this motion, due to the mobility of the clamp 4 the inclined face 6 slides onto the bevel 3 of the pane of glass 1, while the clamp 4 moves, perpendicularly to the axis X, away from the pane of glass 1.

A self-adjusting of the clamp 4 is thus obtained in relation to the edge of the pane of glass 1.

As represented in FIG. 4, the thickness of the clamp 4 is less than the height of the bevel 3. The thickness of the clamp 4 could be different without affecting the features of the mounting of the pane of glass 1.

Furthermore, it so happens that, even if the respective inclinations of the inclined face of the clamp 4 and of the pane of glass 1 are not rigorously identical, the pane of glass is nonetheless maintained without clearance and without stressing.

The manufacture of the clamps and of the pane of glass does not therefore require very accurate machining or high costs.

The upper edges of the slot 11 are flared so as to cooperate with the conical head of a fastening screw 7 whose other end can engage into a bore provided in the support 2. Once tightened, the head of the screw 7 is thus completely integrated into the volume of the clamp 4.

To enable the pane of glass to expand without breaking, while being maintained without clearance, an expansion seal 8 in elastic material covers the inclined face 6 of the clamp 4 (FIGS. 3 and 4). Furthermore, a free space 9 enabling the pane to expand must be provided between the support 2 and the vertical part of the cutting edge of the pane of glass 1.

Figure 5:
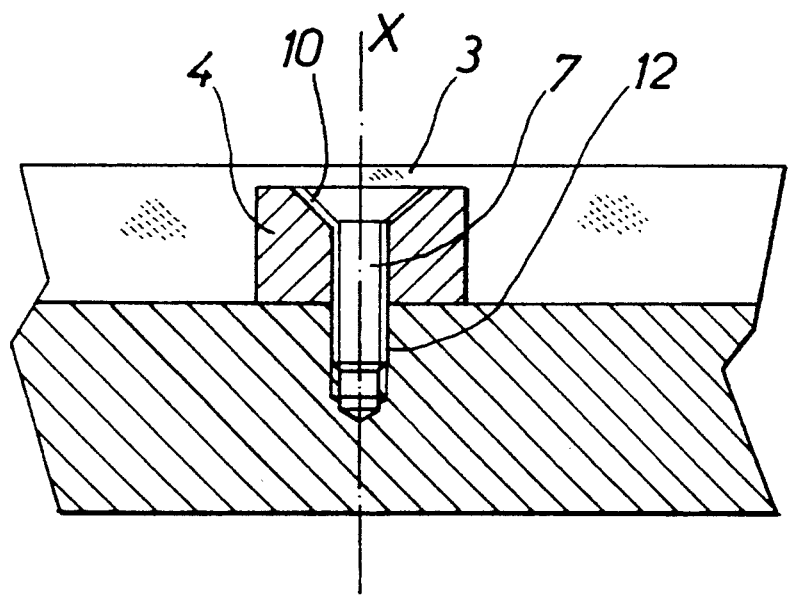
FIG. 5 shows a section along BB of the clamp at the level of the fastening screw.

In the example represented in FIGS. 2 and 5, a shim 10 in a material with a high coefficient of friction and high compressibility (e.g. in foam) covers one of the inclined edges of the slot 11 so that, during tightening of the screw 7, the head of the screw rubs against this shim 10. By means of this friction on just one side of the slot, the torque exerted on the head of the screw to communicate rotational motion to it is partially transmitted to the clamp 4 as a force directed towards the pane of glass 1.

This arrangement ensures that, at the end of tightening the screw 7, the clamp 4 is perfectly adjusted against the bevelled face 3 of the pane of glass 1.

Moreover, after mounting the clamp 4, the friction generated by the shim 10 advantageously opposes ill-timed unscrewing of the screw 7, e.g. due to vibrations.

By means of the high compression strength of the shim 10, the head of the screw 7 completely crushes it to apply itself with a similar force against the two edges of the slot 11. Deformation of the clamp 4 due to the tightening of the screw 7 is thus avoided.

An important advantage of this mounting device is derived from the low space requirements of the clamps, the height of the latter being of similar or even smaller dimensions than the thickness of the pane of glass emerging from the rabbet of the support 2. The utilisation of a conical head screw which integrates completely into the volume of the clamp contributes to further reducing the space requirements of the clamps.

We claim:

1. A device for clearance-free mounting of a pane of glass onto a rigid support by means of at least one block applying on an edge of said pane and having:
   a bearing face applied on said support,
   a through passage along an axis perpendicular to said support, in which can freely pass a fastening screw intended to be screwed into said support, said passage penetrating said block having an oblong section in a plane parallel to said support, extending along a longitudinal axis perpendicular to said edge, and an oblique face extending from said bearing face, which applies on said edge on at least a point belonging to said longitudinal axis, this face sliding and self-adjusting against the edge of said pane of glass during screwing of said screw.

2. The device as claimed in claim 1, wherein the portion of the edge of the pane of glass against which the block comes to fit, has an inclination bevel similar to that of said oblique face.

3. The device a claimed in claim 2, wherein the head of the screw is in the shape of a cone which cooperates with flared-shaped edges of the passage so that, once tightened, said head of said screw is completely seated within the passage.

4. The device as claimed in claim 1, wherein the oblique face of the block is covered by an expansion seal.

5. The device as claimed in claim 1, wherein the portion of the edge of the pane of glass against which the block comes to fit, has a rounded profile.

6. The device as claimed in claim 1, wherein the block comprises a means for maintaining it against the edge of the pane of glass during screwing of the screw.

7. A device for clearance-free mounting of a pane of glass onto a rigid support by means of at least one block applying on an edge of said pane and having:

a bearing face applied on said support, a through passage along an axis perpendicular to said support, in which can freely pass a fastening screw intended to be screwed into said support, said passage having an oblong section along a plane parallel to said support, extending along a longitudinal axis perpendicular to said edge, an oblique face extending from said bearing face, which applies on said edge on at least a point belonging to said longitudinal axis, and a material with a high coefficient of friction covering one of the edges of the passage susceptible of coming into contact with the head of the screw, said oblique face sliding and self-adjusting against the edge of said pane of glass during screwing of said screw, a screwing movement of the screw inducing through said material a force to be applied on the block towards the edge of the pane of glass.

8. The device as claimed in claim 7, wherein said material has a high compressibility.

9. A device for clearance-free mounting of a pane of glass onto a rigid support by means of at least one block applying on an edge of said pane and having:

a bearing face applied on said support, an oblique face extending from said bearing face, which applies on at least a point of said edge, and a through passage along an axis perpendicular to said support, in which can freely pass a fastening screw intended to be screwed into said support, said passage having a U-shaped section along a plane parallel to said support open towards a side opposite the oblique face, said oblique face sliding and self-adjusting against the edge of said pane of glass during screwing of said screw.

* * * * *